United States Patent [19]

Berger et al.

[11] Patent Number: 5,309,133
[45] Date of Patent: May 3, 1994

[54] TEMPERATURE SENSOR

[75] Inventors: Siegbert Berger, Bretten; Volker Brennenstuhl, Zaberfeld; Gerhard Goessler, Oberderdingen; Hans Mohr, Sulzfeld; Wilfried Schilling, Kraichtal-Mue; Juergen Schwackenhofer, Sulzfeld; Eugen Wilde, Knittlingen, all of Fed. Rep. of Germany

[73] Assignee: E.G.O. Elektro-Gerate Blanc u. Fischer, Fed. Rep. of Germany

[21] Appl. No.: 832,433

[22] Filed: Feb. 7, 1992

[30] Foreign Application Priority Data

Feb. 7, 1991 [DE] Fed. Rep. of Germany ....... 4103642

[51] Int. Cl.$^5$ .......................... H01C 7/10; H01C 3/04
[52] U.S. Cl. .................... 338/22 R; 338/25; 338/28; 338/238
[58] Field of Search .................. 338/24, 25, 22 R, 28, 338/238, 209, 100, 223, 239, 240, 241, 242

[56] References Cited

U.S. PATENT DOCUMENTS 2,728,833 12/1955 Dickey .
3,638,303 2/1972 Mochizuki .
3,723,935 3/1973 Frazier et al. .
4,398,169 8/1983 Hayashi .
4,575,705 3/1986 Gotcher .................................. 338/28
5,117,216 5/1992 McQueen ............................ 338/24

FOREIGN PATENT DOCUMENTS 1063493 8/1959 Fed. Rep. of Germany .
1489263 8/1969 Fed. Rep. of Germany .
1921429 11/1970 Fed. Rep. of Germany .
2337035 2/1975 Fed. Rep. of Germany .
2711112 9/1978 Fed. Rep. of Germany .
3721983 1/1989 Fed. Rep. of Germany .
3802715 8/1989 Fed. Rep. of Germany .

Primary Examiner—Marvin M. Lateef
Attorney, Agent, or Firm—Quarles & Brady

[57] ABSTRACT

In the manner of a tubular heater, a temperature sensor comprises a metallic tubular jacket with internal resistance wire coil embedded in insulating material and closing pieces having electrical connection members, so that a very simple, robust and high temperature-resistant temperature sensor with a measuring range up to e.g. approximately 750° C. is obtained. The temperature sensor jacket can be earthed or grounded. For operating the temperature sensor there is appropriately a test current in the mA range in the case of a test voltage in the mV range, whose temperature-dependent changes are processed by means of an electronic amplifier.

19 Claims, 2 Drawing Sheets

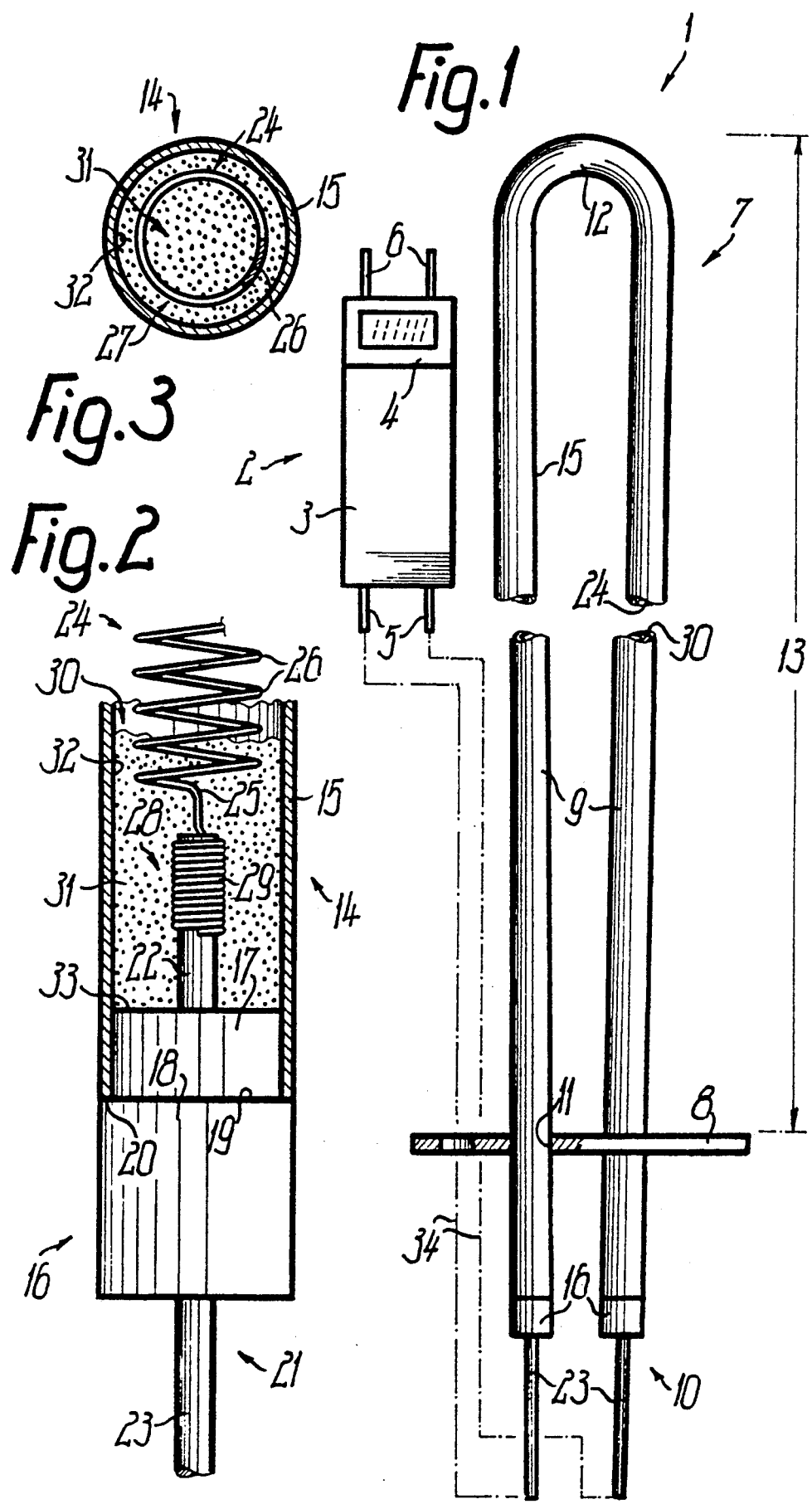

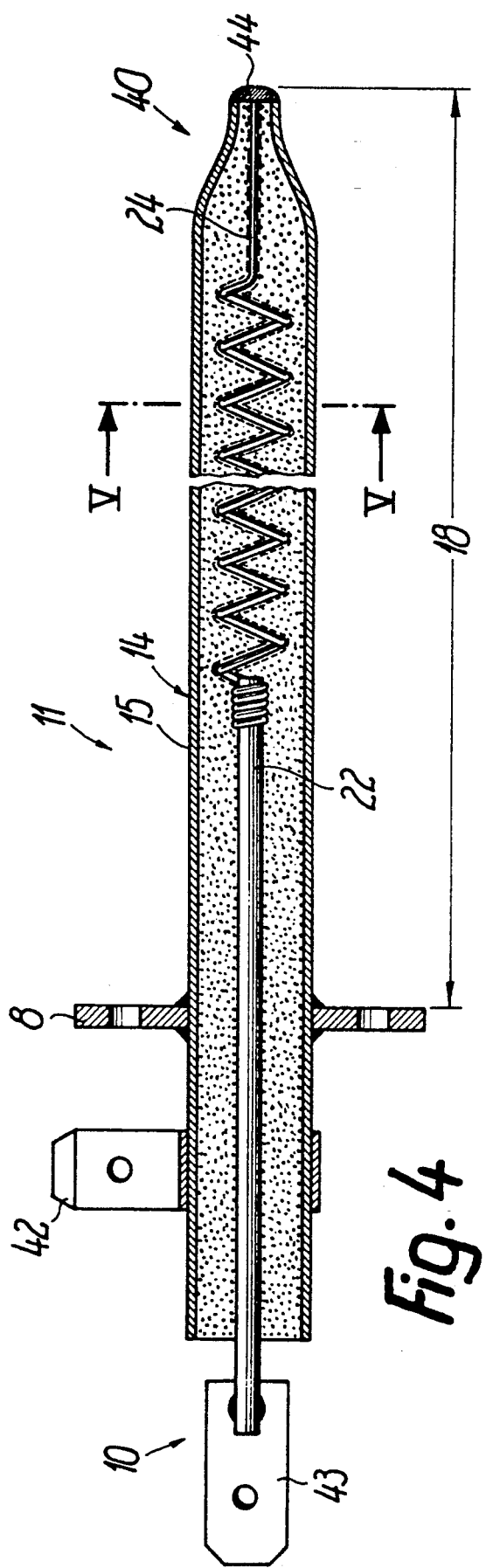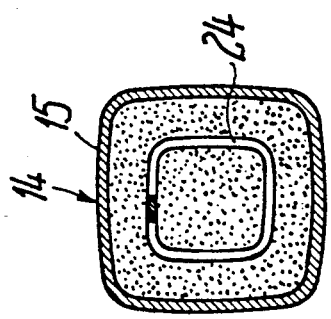

TEMPERATURE SENSOR

BACKGROUND OF THE INVENTION

The invention relates to a temperature sensor with a temperature-sensitive sensing element, which can be placed in a substantially protected manner in a sensor casing, as well as to a method for its manufacture.

Temperature sensors usually operate on the basis of the thermal expansion of a liquid or solid, or if constructed as electrical or electronic temperature determination devices, on the basis of the temperature-dependent change to the electrical resistance value of the sensing element or temperature sensor. The resistance values can change linearly/non-linearly or positively/negatively with the temperature. Particularly in the case of resistance sensors the temperature for the measurement is determined in a spatially closely defined area, because the precision resistor or the thermocouple is located in the tip or front region of the sensor casing. Known temperature sensors are usually very sensitive to thermal, electrical, electromagnetic and mechanical loading or overloading and it is very difficult to obtain an earthing action or security against short-circuiting. In addition, known temperature sensors are expensive to manufacture, whilst also being prejudicial to the environment when use is made of problematical materials such as sodium or potassium. It is usually difficult to fit known temperature sensors.

OBJECTS OF THE INVENTION

An object of the invention is to provide a temperature sensor of the aforementioned type, which avoids the disadvantages of known constructions and which in particular, with respect to the stresses and loads which occur, has a high robustness and accuracy, is simple to manufacture and also fit. A further object of the invention is to provide a temperature sensor usable in a very high measuring range, e.g. over several 100° C. and having a high measuring accuracy independently of the measuring range.

SUMMARY OF THE INVENTION

The invention proposes a temperature sensor and a method for its manufacture, in which the sensor is partly or completely located in a support or bed and therefore can be adequately reinforced or protected by encasing even in the case of the smallest sensing element cross-section. The bed can have a lower thermal conductivity than the sensing element, particularly if its thickness between the outer circumference of the sensing element and the outer circumference of the temperature sensor exposed to the temperature to be measured is only a few millimeters, e.g. less than 5 or 2 mm. It is particularly appropriate if the sensor casing or its outer face is not formed by the bed, but by a separate component, whose thermal conductivity is much higher than that of the bed. Favourable heat conduction conditions are obtained if the bed engages closely and substantially in a whole-surface manner on the outer faces of the sensing element and/or the inner face of the sensor casing, so that it is possible to greatly reduce the inertia of the temperature sensor due to large heat conduction cross-sections and optionally reduced heat storage capacity of one or all the said components. The sensor casing wall thickness is appropriately much smaller than the cross-sectional thickness of the bed and can be approximately the same as the sensing element material thickness, i.e. well below 1 mm.

The object of the invention can also be solved in that, particularly in the case of an electrical resistance sensor, the determination range of the temperature sensor, i.e. that range to which is exposed the medium to be measured, namely a gas, a liquid and/or a solid, is elongated and has a length which is much more than 10 times the width of the outer cross-section of the temperature sensor and which can be 40 to at least 60 or even 80 to 100 or 120 times the said width. Over the said length at least one of the components of the temperature sensor or all the said components can have substantially constant outside and/or inside cross-sections, so that over the entire length or in any random length portion thereof there can be identical thermal characteristics relative to the thermal conductivity in the interior, the heat exchange to the outside, the heat storage and/or optionally the electrical resistance.

Advantageously the bed is formed by an initially flowable or pourable material, in which at least one sensing element is inserted and which is only shape pressed following compaction or compression, so that it is applied in a whole-surface manner to the outer faces of the sensing element under pressure action. Thus, substantially the entire sensing element can be completely surrounded without interruption by a shape pressed granular material or the like and which despite the resilience of the temperature sensor ensures a high endurance limit. If a separate sensor casing is provided, the embedding material can be compacted or shape pressed after introduction into the said casing and consequently can be applied under pressure to the inner faces of the sensor casing in a substantially complete and uninterrupted manner, so that a composite body formed from the three components is obtained, which has a very high strength. In place of a vibrating or axial compression of the embedding material, a moulding or pressing can advantageously be obtained in that the walls of the sensor casing, following the insertion of the sensing element and the filling of the embedding material, are outwardly deformed at right angles to their faces against the sensing element by compression loading, so that the embedding material is pressed or shape pressed, accompanied by the simultaneous inclusion of the sensing element. For example, by rolling, it is also possible to obtain a uniform structural compression of the walls of the sensor casing over the entire circumference thereof, particularly if the sensor casing material has an adequate toughness. The bed strength can be further increased by a binder.

The temperature sensor, particularly the sensing element and/or the bed are appropriately encapsulated in an at least liquid-tight or gas-tight manner, at least in the temperature determination area and lead-outs for measured value conductors traversing the sensor casing can be correspondingly sealed. For this purpose, e.g. in the end region the bed can be impregnated with a silicone oil, which ensures a moisture/air seal.

The sensing element, the bed and/or the sensor casing can have a substantially random shape, but are preferably constructed in a substantially strand-like manner, so that roughly over their entire length they have constant outside and/or inside cross-sections and consequently there are constant spacings of the outer circumference of the sensing element from the outer circumference of the temperature sensor. This makes it possible to produce sensor strands of different lengths, e.g. initially as linear rods and then they can be brought into an appropriate shape for the particular use by bending. This shape can have at least one part or complete circular portion, at least one angular portion and/or at least one linear portion. It is particularly appropriate to have a hairpin-shaped construction with two juxtaposed, roughly equally long legs at a limited distance from one another and juxtaposed in a common plane. The leg ends can be provided as connection ends and can e.g. form a two-pin plug. The radius of curvature of the curved portion can be smaller than twice the width of the outside cross-section of the temperature sensor, whereas the leg ends are spaced from one another by a spacing approximately the same as said width.

A particularly advantageous construction is obtained if the temperature sensor is constructed in the manner of a tubular jacket and has an outer jacket formed by a portion of a profile rod or a jointless tube, which receives in a completely contact-free and roughly coaxial manner an electrical resistance wire enclosed in the ceramic bed. This appropriately extends over at least half of the length of the tube jacket or approximately over its entire length, so that its two ends in the vicinity of the two ends of the tubular jacket are suitable for connection to leads. The ends of the tubular jacket can be sealed closed in the described manner with dimensionally stable, prefabricated locking or closing pieces made from insulating material or the like and form short extensions of the tubular jacket ends and have central passage openings, which are traversed in sealed manner by substantially linear terminal pins. The ends of the terminal pins projecting over the inner ends of the closing pieces are conductively connected to the particular end of the sensing element, whereas their outer ends projecting roughly in the axis of the associated temperature sensor end form exposed terminal pins, which can be connected to the leads by welding or by means of connecting elements, such as flat connecting tongues fixed thereto. Up to its ends the tubular jacket can have constant outside or inside cross-sections and the closing pieces can be inserted in stop-limited manner in said ends and consequently are precisely centred or aligned. The bed can extend up to the inner end face of the closing piece and consequently also surrounds the associated inner end of the connecting member and its connection to the sensing element.

A closing piece can e.g. be constructed in the form of a silicone rubber plug or it is possible to fix a silicone tube drawn over the terminal pin by rolling down the casing jacket between the latter and the said pin. It is also possible to melt in or round the sensor casing end and the terminal pin using a glass frit, in order to bring about a good seal. To avoid measured value pulsifications, it is advantageous if the two ends of the sensing element, i.e. their electrical connections to the terminal pin or to the sensor casing are in each case at the same temperature, because otherwise there could be thermal stresses. Therefore both should either be in the temperature determination range or both should be outside the same.

The sensing element is appropriately constituted by a wire coil, which forms a uniformly interrupted jacket surrounding a core space, so that the latter and the entire helical jacket opening can be filled with embedding material and leads to a close embracing of all the surfaces of the sensing element with the embedding material.

The sensing element is appropriately designed in such a way that its electrical resistance value varies very considerably with the temperature, such as e.g. by several 100% over the thermal measuring range. To this end the sensing element can be made from nickel, iron and/or cobalt-containing material combinations. The sensor casing can be made from high temperature-resistant steel, particularly high-grade stainless steel and can have metallic bare or oxidized surfaces. The bed forming a heat transfer medium between the outer face of the temperature sensor and the sensing element, is appropriately made from an electrically insulating material, which can be a ceramic material, or at least one metal oxide, particularly magnesium oxide. The closing pieces can be appropriately made from hardened moulding material or ceramic material, such as steatite.

This leads to a high temperature-resistant construction of the temperature sensor, which can be used up to approximately 750° C. or even higher. The cross-sectional width of the temperature sensor appropriately having substantially circular outer cross-sections is appropriately roughly 3 to 7 mm, preferably 4.2 mm or 6,5 mm, so as on the one hand to obtain an adequately low inertia of the response behaviour and on the other hand provide an adequately high dimensional stability. In the same way as tubular heaters, the temperature sensor, as a function of the intended application, can also have cross-sections diverging from the circular shape and e.g. for thermal coupling to a measurement point can have at least one flattened cross-sectional side, or can be triangular with rounded corner areas. The sensor can also be partly or completely embedded, e.g. by casting in a metal shaped article or the like.

The sensing element, which is appropriately subject to the action of a test current, advantageously has associated with it an amplifier circuit of an evaluating instrument for the evaluation of said current. For the construction and dimensioning of said amplifier circuit it is advantageous if at ambient temperature, namely approximately 20° C., the sensing element has a resistance value of more than 5 ohm and/or less than 100 ohm. In conjunction with the test current flowing through the sensing element of a few milliamperes, this gives test voltages in the millivolt range.

It is possible to easily manufacture the temperature sensor in an inexpensive, robust manner, the materials used being compatible with the environment and reprocessible and even if faults occur the temperature sensor causes no hazards. It is easy to fit the temperature sensor, no microconnection being required for connection purposes. If the temperature sensor becomes inoperable as a result of mechanical damage, this is very easy to detect. The sensor casing can also be earthed or grounded and therefore made suitable for protection class I. The temperature sensor can also be made short-circuit-proof. The temperature sensor has an integrated sensor behaviour, averaging being possible over the temperature. It is insensitive to overcurrents, overvoltages or electromagnetic disturbances, so that the electronics wired with the sensing element are protected.

The method for the manufacture of the temperature sensor can be performed as for the conventional manufacture of a tubular heater and conventionally there can be a cross-sectional reduction of the jacket by the pressing to shape of the embedding material. As a result of all the deformation processes, including coil formation, the wire-like sensor element has an up to 10% higher resistance than in the soft state. So that there is no fear of a resistance change under the subsequent action of heat, at this stage the temperature sensor should be subject to an annealing process, which can e.g. be performed at 1050° C. in a furnace or by self-heating with current supplied by the sensor. A relatively short heating over 10 to 20 seconds is adequate.

It has been found that as a result of a deformation of the sensor casing, e.g. the tubular jacket, there is also a change to the sensing element resistance by values of up to 10 and max 20% in the upward direction. This initially inexplicable phenomenon would appear, as revealed by tests and the production of micrographs, to result from a simultaneous sensing element length and diameter reduction during the moulding of the jacket, particularly when constructed as a wire coil. The pressing of the individual grains of the embedding material into the wire also influences its resistance. On the basis of this, it is advantageously possible to carry out a resistance adjustment in the finished state of the sensor, in that the resistance of the sensing element is dimensioned in such a way that it is somewhat below the desired value and then, by planned shaping or moulding of the sensor casing, e.g. from a circular to a rounded, square, triangular or similar form and accompanied by a simultaneous measurement of the resistance value, said resistance is raised to the desired value and on reaching this the press shaping is stopped.

This process can also be linked with the annealing process and normally follows the latter. As described, annealing decreases the resistance, whereas pressed shaping raises it. An adjustment in either direction can be brought about by combining these two methods.

Tests have shown that an undesired and hitherto not investigated increase in the resistance of such sensors in the case of long-term use, particularly under high temperatures, can be attributed to an oxidation of the sensing element within the bed. Even in the case of good sealing of the ends, it is not possible to avoid the penetration of air and the sensor is covered with an oxide coating which has a higher resistance than the metal used. This sensor resistance drift can be prevented according to the invention by a stabilization process. The finished temperature sensor is heated in a furnace or by self-heating on a number of occasions, e.g. 10 to 100 times over in each case several hours, e.g. to 600° C., followed by cooling. In order to speed up oxidation this can take place in an oxygen-enriched atmosphere. As a result of the thermal expansion and contraction of the air residues enclosed in the bedding material the sensing element "pumps" oxidizing air into the heater and forms a uniform oxide coating. The resistance value increases by a few percent e.g. 2.5%. This can be taken into account when designing the sensing element, so that the resistance value is then "highly oxidized" to its desired value. This process can also be used for a fine adjustment of the resistance value.

A temperature sensor treated in this way is then insensitive to further cyclic long-term influences. The oxidation stabilization can be assisted in that it takes place prior to the final sealing of the heating conductor ends, if this e.g. takes place by encasing, sealing in, etc.

These and other features can be gathered from the claims, description and drawings and the individual features, either alone or in the form of subcombinations, can be realized in an embodiment of the invention and in other fields and can represent advantageous, protectible constructions for which protection is hereby claimed.

BRIEF DESCRIPTION OF THE DRAWINGS

An embodiment of the invention is described in greater detail hereinafter relative to the drawings, wherein show:

FIG. 1 A view of an inventive temperature sensor.

FIG. 2 A detail of FIG. 1 in a larger-scale, sectional representation.

FIG. 3 A cross-section through FIG. 2.

FIG. 4 A longitudinal section through another embodiment of the invention.

FIG. 5 A cross-section along line V in FIG. 4.

DETAILED DESCRIPTION OF PREFERRED EMBODIMENTS

The temperature sensor 1 according to FIGS. 1 to 3 can be manufactured with the same devices, apparatuses, machines and methods as a tubular heater and for use is to be connected to a control unit 2, which has an amplifier 3, a unit 4 for evaluating the test current or voltage changes and a two-pin outlet 5 for conductive connection to the temperature sensor 1 and a corresponding inlet 6 for connection to a power supply.

Over most of its length the temperature sensor 1 forms an inherently rigid sensor arm 7 which, in freely projecting manner, can be so installed that it projects into the medium to be measured. The sensor arm 7 projects over the inside of a plate-like or planar fastening flange 8, to which it is fastened with two roughly identical legs 9 in such a way that it forms on the outside of the fastening flange 8 two juxtaposed connection ends 10 positioned roughly parallel in a common plane. For each leg 9 the fastening flange 8 has a closely adapted, circumferentially closed passage opening 11 through which the leg 9 is passed in sealed manner. Each leg can e.g. be secured by a weld between its circumferential surface and at least one plate side of the fastening flange 8. At the end of the sensor arm 7 remote from the fastening flange 8 the legs 9 diverging by a few radians to said end pass into one another over an approximately semicircular arc 12, which with respect to substantially all the cross-sectional areas is constructed in the same way as the legs 9 and is connected thereto tangentially in step-free manner, because in each cross-sectional area it is constructed in one piece with the associated cross-sectional areas of the legs 9. Between the inside of the fastening flange 8 and the arc apex the temperature sensor 1 forms the determination area 13 in which it is exposed to the temperature to be determined or measured. All the legs 9 or arcs 12 are exposed over their entire length and circumference, so that the medium to be measured flows entirely round them.

A sensor casing 14 has a non-stainless steel, jointless tubular jacket 15 extending over and beyond the entire length of the determination area 13 in one piece manner and forms a thin-walled, metallic outer skin of all the longitudinal portions of the sensor arm 7, as well as the connecting faces for connection to the fastening flange 8. Both ends of the tubular jacket 15 projecting by roughly the same amount over the outside of the fastening flange 8 are here tightly sealed by a separate and not a common blocking or closing piece 16 and, like the latter, have an internal spacing from one another roughly corresponding to the cross-sectional width of the tubular jacket 15 and permitting an elastic mobility. Each of the two, roughly identically constructed closing pieces 16 is formed by a hard, electrically insulating ceramic material with only two longitudinally connected portions of different cross-sections, which at the most extend up to the envelope of the tubular jacket 15 defined by the outer circumference. An inner portion forms a connecting projection 17, which is closely adapted to the inner circumference of the end of the tubular jacket 15 and over its entire length is inserted in tightly engaging manner in said end and is optionally also secured by an adhesive cement or the like. To the relatively short connecting projection 17 is connected an outer, further end portion 18, which has roughly the same outside cross-section as the tubular jacket 15 and forms a substantially uninterrupted or step-free extension of its outer circumference. The end portion 18 passes via a ring shoulder into the connecting projection 17, which stop-engages on the associated end face 20 of the tubular jacket 15.

In a central passage bore traversing both faces and entirely located in spaced manner within the outer circumference, the closing piece 16 receives in sealed manner a solid, inherently rigid terminal pin 21 located in substantially equiaxial manner to the associated end of the tubular jacket 15 and which can be formed by a linear portion of a round wire. Its inner end 22 projects over the inner end of the closing piece 16 or in contact-free manner with respect to the tubular jacket 15. Its outer end 23 projects in exposed manner over the outer end face of the closing piece 23 and forms a connecting member for electrically conductive connection of the temperature sensor 1 to the associated pin of the outlet 5.

Within the sensor casing 14 and contact-free relative to the tubular jacket 15 is provided a single, strand-like sensing element 24, which is substantially equiaxial to the tubular jacket 15 and extends in one piece or continuously with substantially constant cross-sections at least over all the longitudinal portions of the determination area 13. In this way it can extend over and beyond the determination area 13, namely up to the outside of the fastening flange 8 and up to an area spaced therefrom, which can be close to the ends of the tubular jacket 15 or at the closing pieces 16, but spaced therefrom.

The sensing element 24, which traverses the path described by the legs 9 and the arc 12 and the fastening flange 8, is formed by a single wire 25, which is wound over the entire length of the sensing element 24 in the form of a continuous coil 26 with an approximately constant coil width and pitch. The approximately coaxial coil 26 located entirely within the tubular jacket 15 forms a jacket boundary 27 visible in FIG. 3, which over its length and/or circumference has roughly constant spacings from the sensor outer circumference. Each end of the wire 25 forms a connecting end 28 diverging from the helical shape and which is electrically conductively fixed to the inner end 22 of the associated terminal pin 21. The connecting end 28 can be constructed e.g. as a fastening coil 29 closely adapted to the outer circumference of the inner end 22 and having closely juxtaposed turns, which is mounted on the inner end 22 and/or can be fixed thereto by welding or the like. The coil 26 starts immediately adjacent to the end face of the inner end 22.

Substantially all the still free spatial areas of the sensor casing 14 not taken up by the sensing element 24, its connection areas and the closing pieces 16 are filled with a bed 30 of a shape pressed, granular embedding material, which engages substantially uninterruptedly and closely with the inner face 32 of the tubular jacket 15, the surfaces of the sensing element 24, the connection end 28, the inner end 22 and/or the inner end face 33 of the closing piece 16. Thus, within the said bed 30 are embedded in a fully enclosed manner all the components located inside the sensor casing. The bed 30 forms a support filling, which prevents buckling of the tubular jacket 15 on bending an arc 12 or the like.

By means of the fastening flange 8, which optionally has passage holes for the fastening screws, the temperature sensor 1 can e.g. be fixed in sealed manner to the wall of a fluid container so that the sensor arm 7 passes in contact-free manner through an opening in said wall into the container and the connection ends 10 are accessible on the container outside. These connection ends 10 can be detachably connected to flexible leads 34, which are in turn detachably connected to the pins of the outlet 5 of the instrument 2. This permits the use for numerous different applications of the temperature sensor, which can be fixed in an easily interchangeable manner.

The temperature sensor 1 shown in FIG. 4 is shaped like a straight rod. The sensor casing 14 is correspondingly a straight rod, its free end 40 facing the connection end 10 is somewhat tapered and closed there by a weld 44, to which is welded one end 41 of the sensing element 24. The helical sensing element is fixed conductively to the terminal pin 22 by its other end.

The two connection ends of the sensing element 24 in the temperature determination area 13 must be at substantially the same temperature. This avoids the occurrence of thermal stresses at the connection points, which could falsify the measured results.

As the tubular jacket 15 of the sensor casing 14 forms the return line for the test current, outside the fastening flange 8 a connecting lug 42 is fitted to the tubular jacket, whilst the end of the terminal pin 22 projecting from the connection end 10 carries the other connecting lug.

A broken line on the surface of the sensing element 24 indicates that an oxide coating has formed there as a result of the initially described stabilization process and which protects the sensing element against further oxidation and resistance falsification.

FIG. 5 shows that the cross-section of the tubular jacket 15 is in the present case deformed from the circular cross-section towards a rounded square. This also has an effect on the shape of the helical cross-section of the sensing element 24. As a result of this deformation under strong pressing or rolling pressure the sensing element resistance changes by up to 20%, so that as a result of an optionally automated press shaping under the control of a resistance measurement, it is possible to obtain a precise adjustment of the resistance value of the sensor in the finished state.

We claim:

1. A temperature sensor (1) for sensing a temperature of a medium, comprising:

a sensing arm (7) having at least one arm leg (9) and a free arm end (12), said arm leg (9) having an outer circumferential surface;

said sensing arm (7) having a casing tube (15) made of electrically conducting material, said casing tube (15) providing first and second tube ends (20, 40) and a tube interior surface (32), said outer circumferential surface defining an external sensor width extension;

an electrical sensing resistor wire (24) located in and along said casing tube (15), said sensing resistor wire (24) being a resistor coil (26) provided by a resistor wire (25), said resistor wire (25) providing first and second connecting ends (29, 41) for electrical connection of said sensing resistor wire (24);

an insulating material (30) embedding and insulating said sensing resistor wire (24) with respect to said casing tube (15), said first connecting end (29) being provided within said insulating material (30), said insulating material (30) connecting to said tube interior surface (32);

at least one terminal pin (21) having inner and outer pin ends (22, 23), said inner pin end (22) being electrically conductively connected to said first connecting end (29) within said insulating material (30);

first and second closures (16, 44) sealingly closing said first and second tube ends (20, 40), said first closure (16) being sealingly traversed by said terminal pin (21);

a flange (8) for mounting said temperature sensor (1) to a wall, said flange (8) having flange faces including an inside flange face and an outside flange face, said inside flange face and said outside flange face being remote from each other, thereby defining flange sides including a flange inside and a flange outside respectively, said temperature sensor (1) having specified sections including a temperature detecting section from said flange inside to said free arm end (12, 40) and a non-detecting section from said flange outside and extending in a direction opposite said temperature detecting section, said detecting section (13) being provided to be exposed to the medium, said sensing arm (7) freely projecting past said flange inside, said outer pin end (23) and said first tube end (20) being provided on said flange outside, said flange (8) being traversed by at least one boro (11) closely adapted to said arm leg (9) and sealingly traversed by said arm leg (9), said outer circumferential surface being fixed to said flange (8), said first and second connecting ends (29) being provided commonly on a single one of said specified sections (13), between said flange inside and said arm end (12), said casing tube (15) defining an overall tube length extension (13) provided to be in contact with the medium, said resistor coil (26) defining an overall coil length extension, wherein said coil length extension extends substantially entirely over said tube length extension (13);

at least in said detecting section (13), said resistor coil (26) being sealingly encapsulated to provide gas-tight and liquid-tight sealing of said resistor coil, said first closure (16) being sealingly traversed by said terminal pin (21) to provide a gas-tight and liquid-tight seal.

2. The temperature sensor according to claim 1, further comprising seal means for encapsulating said resistor coil (26), said seal means including a seal between said first closure (16) and said terminal pin (21) and further including a seal between said first closure (16) and said tube interior surface, said resistor coil (26) being located substantially coaxially with respect to said casing tube (15).

3. The temperature sensor according to claim 2, wherein said first closure (16) is a prefabricated closure member having an inner closure section (17) and an outer closure section (18) connecting to said inner closure section (17) via a ring shoulder (19), said first tube end (20) having an end face, said inner closure section (17) sealingly engaging said tube interior surface and said outer closure section (18) being located outside said casing tube (15), said closure member (16) connecting to said end face.

4. The temperature sensor according to claim 2, wherein said casing tube (15) defines an envelope, said first and second closures (16, 44) extending at the most up to said envelope.

5. The temperature sensor according to claim 3, wherein said first closure (16) is a silicone plug inserted in said casing tube (15).

6. The temperature sensor according to claim 1, wherein said resistor coil (26) has a helical shape having a coil width extension and a coil pitch, said coil width extension and said coil pinch being substantially constant over said coil length extension, said first and second connecting ends (29) having shapes differing from said coil shape.

7. The temperature sensor according to claim 6, wherein said first connecting end (29) is a connecting coil having closely juxtaposed coil turns said inner pin end (22) having an outer pin circumferential surface, said connecting coil (29) being closely adapted to said pin circumferential surface and connected to said pin circumferential surface by welding.

8. The temperature sensor according to claim 1, wherein said first and second connecting ends (29) are providing on said flange inside, only one of said sensing resistor wire (24) being provided, said resistor coil (26) defining an outer coil circumferential surface (27) having substantially constant spacings from said outer leg circumferential surface over said coil length extension and said coil circumferential surface, said sensing resistor wire (24) being exclusively located within said temperature detecting section (13).

9. The temperature sensor according to claim 1, wherein said casing tube (15) is substantially straight, said arm end (40) being tapered, said second closure (44) being a closure weld closing said arm end (40), said second connecting end (41) being provided by said resistor wire (24) being welded to said closure weld (44), said casing tube (15) providing an electrical connecting lead for said sensing resistor wire (24); on said flange outside, said connecting lead (15) providing connecting means (42) for electrical connection to an appliance line (34).

10. The temperature sensor according to claim 1, wherein said resistor coil (26) is provided with an oxide coating.

11. The temperature sensor according to claim 1, wherein said insulating material (30) contains grains (31), said grains being pressed into said resistor wire (24).

12. The temperature sensor according to claim 1, wherein said tube length extension is at least 40 times more than said external sensor width extension.

13. The temperature sensor according to claim 1, wherein, in an initial unpressed state, the insulating material is at least partly formed by a pourable bulk material compressed by shape pressing accompanied by hardening and wherein said casing tube is substantially completely and uninterruptingly filled with the insulating material and the resistor wire.

14. The temperature sensor according to claim 1, wherein the casing tube is at least partially made from stainless steel.

15. The temperature sensor according to claim 1, wherein said resistor wire has a temperature-variable resistance value, the resistor wire being formed of an alloy containing at least one of the elements nickel, iron and cobalt.

16. The temperature sensor according to claim 1, wherein, at a reference temperature of about 70° F., the resistance value of the resistor wire is at least 1 ohm.

17. The temperature sensor according to claim 1, wherein the terminal pin has a larger diameter than the diameter of the resistor wire.

18. The temperature sensor according to claim 1, further comprising a control instrument for feeding in and evaluating a test current in the resistor wire, the electrical test current and voltage being in a mA/mV range, the control instrument having an electronic amplifier for the test voltage.

19. The temperature sensor according to claim 1, wherein the sensor casing is deformable so that the electrical resistance of the resistor wire can be modified.

* * * * *